Patented June 4, 1935

2,003,734

UNITED STATES PATENT OFFICE 2,003,734

PROCESS OF TREATING CAUSTIC SODA SOLUTIONS

Harold Marland Broadhurst, Mossley Hill, Liverpool, England, assignor to Pennsylvania Salt Manufacturing Company, Philadelphia, Pa., a corporation of Pennsylvania No Drawing. Application February 8, 1933, Serial No. 655,859. In Great Britain February 10, 1932

3 Claims. (Cl. 23—184)

This invention relates to a process for the purification of aqueous caustic soda solutions and more particularly it relates to a process for the treatment of concentrated aqueous caustic soda solutions for the removal of sulphate therefrom.

One object of my invention is to provide a simple and economical process for the purification of aqueous caustic soda solutions by which it is possible to obtain solutions and solid caustic soda therefrom of a high degree of purity.

A more specific object is to provide a process for the treatment of caustic soda solutions for the removal of the sodium sulphate contained therein as an impurity.

In the patent to David Arthur Pritchard No. 1,888,886, issued November 22, 1932, there is described a process for the removal of sodium chloride from concentrated solutions of caustic soda by the addition thereto of sulphuric acid or of a salt or salts of sulphuric acid. The process described in the patent results in a marked reduction in the chloride content of the solutions but due to the use of sulphate in the purification step, the sulphate content of the solution is somewhat greater after treatment than it was prior thereto. The process of the present invention is applicable to the treatment of caustic soda solutions which have previously been purified in accordance with the disclosure of the patent as well as to the treatment of caustic soda solutions generally to reduce the sulphate content thereof.

The present invention is characterized by the addition to the aqueous caustic soda solution of a compound which furnishes to the solution a carbonate ($CO_3$) radical. The radical may be supplied by passing carbon dioxide through the solution with the formation therein of sodium carbonate or by the addition to the bath of any of the salts of carbonic acid or or of a mixture of them; for example, sodium, potassium, barium or calcium carbonate may be used. The presence of the carbonate in the caustic soda solution produces a precipitate with the sulphate which appears to be in the nature of a salt containing both the carbonate and sulphate radicals. This compound is insoluble in the caustic soda solution and separates therefrom by precipitation. The caustic soda solution may be freed from the precipitated compound by filtration or by decantation.

In the manufacture of caustic soda, the solution, for example that obtained as the effluent from electrolytic cells, is evaporated in order to increase the concentration. During the evaporation, the liquid becomes saturated with respect to both sodium chloride and sodium sulphate and as the evaporation proceeds beyond this point, these impurities begin to crystallize out and may be separated. The extent to which these impurities may be removed by crystallization depends both upon the degree of concentration of the caustic soda solution and the temperature at which it takes place. In general, it is not advisable to carry the evaporation beyond a point at which the total $Na_2O$ content of the solution amounts to 37% to 39% by weight owing to the danger of solutions of greater concentration partially solidifying on cooling. These concentrated solutions contain both sodium chloride and sodium sulphate, both of which it is desirable to remove. The process of the present invention may be employed to remove the sodium sulphate contained in the concentrated liquors without regard to the removal of the sodium chloride, or the process of Patent No. 1,888,886 may be employed in the first instance to remove the sodium chloride, and thereafter the sodium sulphate may be removed by the process of the present invention.

The process of the present invention is applicable to the treatment of caustic soda solutions of varying degrees of concentration, but in all instances the concentration must be sufficiently high so that the compound containing the sulphate and carbonate will be insoluble therein. The term "concentrated solutions of caustic soda" is employed herein to include all such concentrations. The process is particularly applicable for use in the treatment of caustic soda solutions containing 37% to 39% of $Na_2O$ by weight. In a typical case, a solution of this concentration containing 1% of sodium sulphate based on the $Na_2O$ content may be treated by adding an equal amount of powdered anhydrous sodium carbonate and agitating the solution for two hours at 30° C. to 60° C. The resulting precipitate which contains sodium sulphate and sodium carbonate is removed from the solution by any convenient means, for example, by filtration or it may be allowed to settle and the clear liquor run off from the precipitate.

As previously stated, the solutions may be furnished with the carbonate radical by bubbling carbon dioxide through the solution, and in place of the sodium carbonate, other salts of carbonic acid or mixtures thereof may be employed. In the use of the carbonate, it is not necessary that the compound be added to the solution and the mixture agitated as above described but the process may be conveniently carried out by passing the liquor slowly through a filter bed composed of a carbonate or a mixture of carbonates, in which case, the filtrate obtained has a reduced sulphate content. After the solution has been treated with the carbonates, it may be evaporated further, thereby producing solid caustic soda of a high degree of purity.

The following examples illustrate methods by which the process may be carried out:

Example 1

A caustic soda liquor containing 38.3% $Na_2O$, 1.01% NaCl and 0.069% $Na_2SO_4$ is treated according to the method described in Patent No. 1,888,886 and a clear liquor containing 37.4% $Na_2O$ and 0.419% $Na_2SO_4$ is obtained. 100 parts by weight of this liquor are then treated with 0.33 part by weight of powdered soda ash at 60° C. and the mixture is allowed to settle. The resulting clear liquor contains 37.5% $Na_2O$ and 0.139% $Na_2SO_4$.

Example 2

To 100 parts by weight of caustic soda solution containing 37.47% $Na_2O$, 0.147% NaCl and 0.380% $Na_2SO_4$ are added 0.21 part by weight of powdered anhydrous sodium carbonate. The liquor is then agitated for two hours at a temperature of 50° C. After settling, the clear liquor contains 0.19% $Na_2SO_4$.

Example 3

A caustic soda liquor containing 37.8% $Na_2O$ and 0.17% $Na_2SO_4$ is slowly filtered through a bed composed of equal quantities of sodium carbonate and calcium carbonate, 200 parts by volume of liquor passing through a filter of 600 parts by volume per hour. The filtrate obtained during the first half hour contains 0.049% $Na_2SO_4$ but this degree of purification is not maintained, the $Na_2SO_4$ content of the liquor rising above 0.07% during the second half hour of operation. The average amount of sulphate in the filtrate during a two and one-half hour run is 0.088% $Na_2SO_4$.

Considerable modification is possible in the strength of the caustic soda solutions treated, in the methods of treatment as well as in the particular carbonate and the specific proportion thereof employed without departing from the essential features of the present invention.

I claim:

1. The process of treating concentrated aqueous caustic soda solutions for the removal of sulphate therefrom, which comprises passing the solution through a filter-bed comprising a salt of carbonic acid to cause a reaction between the sulphate of the solution and the carbonate, and the formation of an insoluble salt containing said radicals whereby a clear solution of caustic soda of reduced sulphate content is obtained.

2. The process of treating concentrated aqueous caustic soda solutions for the removal of sulphate therefrom, which comprises passing the solution through a filter-bed comprising a mixture of salts of carbonic acid to cause a reaction between the sulphate of the solution and the carbonate, and the formation of an insoluble salt containing said radicals whereby a clear solution of caustic soda of reduced sulphate content is obtained.

3. The process of treating concentrated aqueous caustic soda solutions for the removal of sulphate therefrom, which comprises passing the solution through a filter-bed comprising a mixture of sodium carbonate and calcium carbonate to cause a reaction between the sulphate of the solution and the carbonate, and the formation of an insoluble salt containing said radicals whereby a clear solution of caustic soda of reduced sulphate content is obtained.

HAROLD MARLAND BROADHURST.